US010088211B2

(12) United States Patent
Unezaki et al.

(10) Patent No.: US 10,088,211 B2
(45) Date of Patent: Oct. 2, 2018

(54) AIR-CONDITIONING APPARATUS (71) Applicant: Mitsubishi Electric Corporation, Tokyo (JP)

(72) Inventors: Fumitake Unezaki, Tokyo (JP); Shinichi Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 179 days.

(21) Appl. No.: 15/028,043

(22) PCT Filed: Nov. 8, 2013

(86) PCT No.: PCT/JP2013/080292
§ 371 (c)(1),
(2) Date: Apr. 8, 2016

(87) PCT Pub. No.: WO2015/068277
PCT Pub. Date: May 14, 2015

(65) Prior Publication Data
US 2016/0245569 A1 Aug. 25, 2016

(51) Int. Cl.
*G05D 23/32* (2006.01)
*F25B 49/02* (2006.01)
(Continued)

(52) U.S. Cl.
CPC ............ *F25B 49/022* (2013.01); *F24F 11/30* (2018.01); *F24F 11/77* (2018.01); *F24F 11/83* (2018.01);
(Continued)

(58) Field of Classification Search
CPC ..... F25B 49/022; F25B 13/00; F24F 11/0079; F24F 11/0012; G05D 23/1902; G05D 23/1932
See application file for complete search history.

(56) References Cited

U.S. PATENT DOCUMENTS 4,997,029 A * 3/1991 Otsuka .................... F24F 3/044
165/11.1
5,025,638 A * 6/1991 Yamagishi ............... F24F 3/044
236/49.3
(Continued)

FOREIGN PATENT DOCUMENTS

CA 2058833 A1 * 7/1993
JP 07-190457 A 7/1995
(Continued)

OTHER PUBLICATIONS

Salvador, Self-Activating Setback Thermostat, Jul. 7, 1993, CA2058833A1, Whole Document.*
Extended European Search Report dated Jul. 6, 2017 issued in corresponding EP application No. 13897017.3.
International Search Report of the International Searching Authority dated Dec. 24, 2013 for the corresponding international application No. PCT/JP2013/080292 (and English translation).

*Primary Examiner* — Larry Furdge
(74) *Attorney, Agent, or Firm* — Posz Law Group, PLC (57) ABSTRACT A controller of an air-conditioning apparatus includes an operation control unit that controls operation of a compressor of a heat source unit based on target indoor temperatures of rooms, an unoccupied room detecting unit that detects an unoccupied room where no person is present among the rooms, and a correction amount setting unit that sets a temperature correction amount for correcting the target indoor temperature in a room controller of the unoccupied room detected by the unoccupied room detecting unit to reduce an air conditioning load for the unoccupied room. After the target indoor temperature is corrected by using the temperature correction amount in the room controller, when the operation capacity of the compressor controlled by the operation control unit is smaller than or equal to a preset operation capacity, the correction amount setting unit resets the temperature correction amount to be decreased by an adjustment amount.

6 Claims, 3 Drawing Sheets (51) Int. Cl.
   *F25B 13/00*   (2006.01)
   *G05D 23/19*   (2006.01)
   *G05B 15/02*   (2006.01)
   *F24F 11/30*   (2018.01)
   *F24F 11/77*   (2018.01)
   *F24F 11/83*   (2018.01)
   *F24F 110/10*  (2018.01)
   *F24F 120/10*  (2018.01)
   *F24F 11/85*   (2018.01)

(52) U.S. Cl.
   CPC .............. *F25B 13/00* (2013.01); *G05B 15/02* (2013.01); *G05D 23/1902* (2013.01); *G05D 23/1932* (2013.01); *F24F 11/85* (2018.01); *F24F 2110/10* (2018.01); *F24F 2120/10* (2018.01); *F25B 2313/0314* (2013.01); *Y02B 30/765* (2013.01)

(56) References Cited

U.S. PATENT DOCUMENTS

2006/0186214 A1* 8/2006 Simon ................. F24F 11/0012
                                                         236/1 C
2012/0310376 A1* 12/2012 Krumm ................. G05B 15/02
                                                           700/31

FOREIGN PATENT DOCUMENTS

| JP | 07-190462 A   | 7/1995  |
|----|---------------|---------|
| JP | 11-006644 A   | 1/1999  |
| JP | 11-132530 A   | 5/1999  |
| JP | 2000-171075 A | 6/2000  |
| JP | 2008-267741 A | 11/2008 |
| JP | 2012-193901 A | 10/2012 |
| JP | 2013-015299 A | 1/2013  |

* cited by examiner

AIR-CONDITIONING APPARATUS

CROSS REFERENCE TO RELATED APPLICATION

This application is a U.S. national stage application of International Application No. PCT/JP2013/080292 filed on Nov. 8, 2013, the disclosure of which is incorporated herein by reference.

TECHNICAL FIELD

The present invention relates to an air-conditioning apparatus that performs cooling and heating of all rooms in a building by using a heat pump.

BACKGROUND ART

In a conventional air-conditioning apparatus, it is proposed to detect presence of a person in each room and provide an efficient operation of the air-conditioning apparatus by setting a weak air-conditioning state when no person is present (see Patent Literature 1). When the weak air-conditioning state is obtained while no person is present, if the air-conditioning apparatus is of a vapor-compression type in which a compressor is installed, the air-conditioning apparatus operates in such a manner that the operation capacity of the compressor is decreased. In this case, an inverter controls the compressor to decrease the rotation speed of the compressor, so that the operation capacity of the compressor is decreased.

CITATION LIST

Patent Literature

Patent Literature 1: Japanese Unexamined Patent Application Publication No. H-07-190457

SUMMARY OF INVENTION

Technical Problem

In some cases in which the rotation speed of a compressor is increased or decreased on the basis of the existence of an unoccupied room, as disclosed in Patent Literature 1, the compressor may be required to operate at the minimum rotation speed or lower. Since the compressor is not allowed to operate at the minimum rotation speed or lower, start-stop operation is performed in which the compressor repeats operating and stopping. However, such start-stop operation causes operation efficiency to be markedly decreased at the time of re-start after stopping, which, on the contrary, results in increase in power consumption of the air-conditioning apparatus.

The present invention has been made to solve the above problems and provides an air-conditioning apparatus that can prevent decrease in operating efficiency due to repeated operating and stopping of a compressor and can realize power-saving operation.

Solution to Problem

An air-conditioning apparatus of the present invention is an air-conditioning apparatus configured to perform heating or cooling of a plurality of rooms and to operate based on target indoor temperatures set to room controllers each provided for a corresponding one of the plurality of rooms, the air-conditioning apparatus including a heat source unit including a compressor; an indoor unit connected to the heat source unit via a refrigerant pipe and configured to perform cooling or heating of the plurality of rooms through a duct; and a controller configured to acquire the target indoor temperatures from the room controllers of the plurality of rooms to control operations of the heat source unit and the indoor unit based on the acquired target indoor temperatures, the controller including an operation control unit configured to control an operation of the compressor of the heat source unit based on the target indoor temperatures of the plurality of rooms; an unoccupied room detecting unit configured to detect an unoccupied room where no person is present of the plurality of rooms; and a correction amount setting unit configured to set a temperature correction amount for correcting a target indoor temperature of the target indoor temperatures set to a corresponding one of the room controllers of the unoccupied room detected by the unoccupied room detecting unit in such a manner that an air conditioning load for the unoccupied room is reduced, wherein, after the target indoor temperature set to the room controller is corrected based on the temperature correction amount, and when an operation capacity of the compressor becomes smaller than or equal to a preset operation capacity, the correction amount setting unit resets the temperature correction amount to be decreased by a preset adjustment amount.

Advantageous Effects of Invention

According to the air-conditioning apparatus of the present invention, even when a load on the air-conditioning apparatus is reduced in a case in which no person is present in a room, the compressor of the air-conditioning apparatus operates continuously without stopping. Accordingly, it becomes possible to prevent decrease in efficiency due to start-stop operation in which the compressor repeats operating and stopping and to realize power-saving operation of the air-conditioning apparatus.

DESCRIPTION OF EMBODIMENTS

Figure 1:
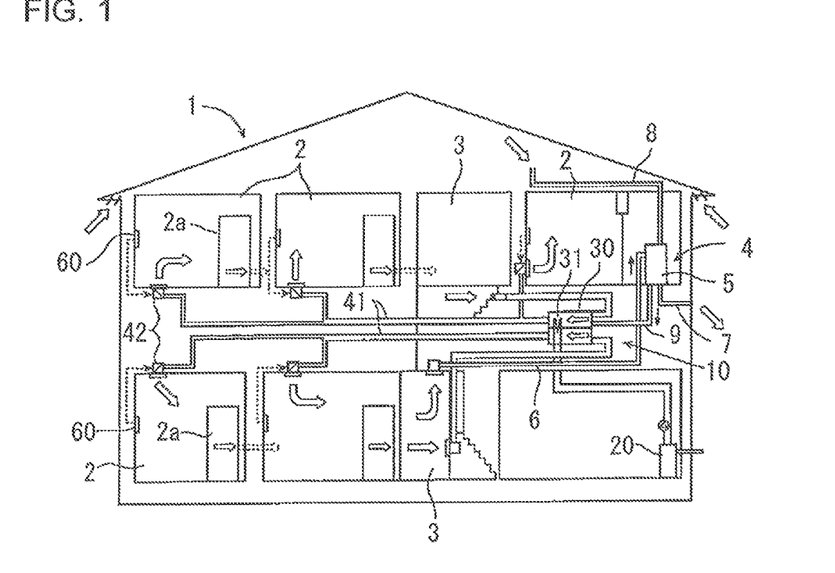
FIG. 1 is a schematic diagram illustrating a preferred embodiment of an air-conditioning apparatus of the present invention.
Figure 2:
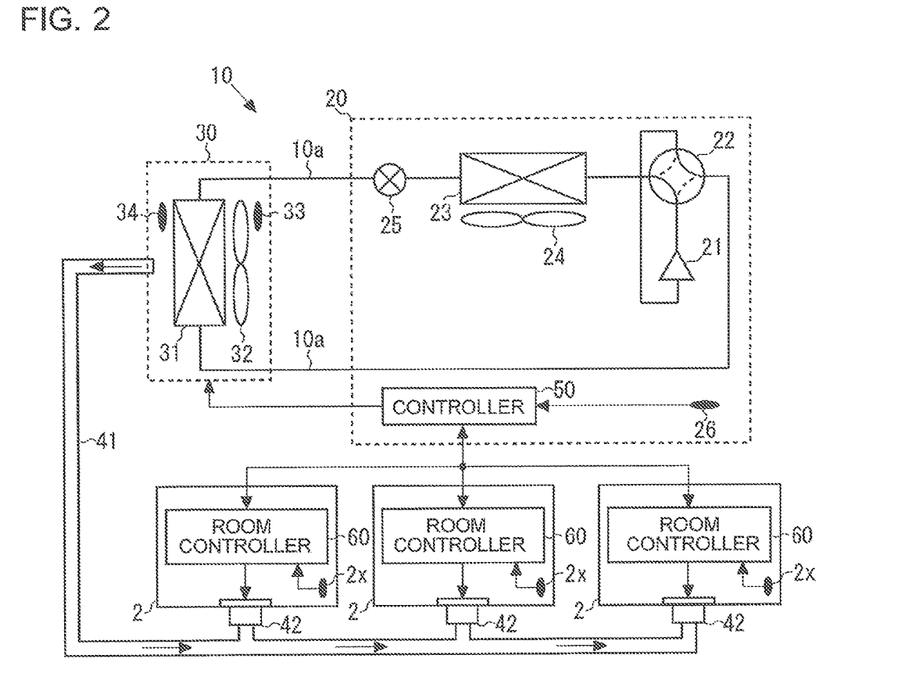
FIG. 2 is a refrigerant circuit diagram illustrating an example of the air-conditioning apparatus illustrated in FIG. 1.

An embodiment of an air-conditioning apparatus of the present invention will be described below with reference to the drawings. FIG. 1 is a schematic diagram illustrating a preferred embodiment of an air-conditioning apparatus of the present invention, and FIG. 2 is a refrigerant circuit diagram illustrating an example of the air-conditioning apparatus illustrated in FIG. 1. An air-conditioning apparatus 10 illustrated in FIG. 1 is installed in a building 1, and the building 1 includes a plurality of rooms 2 on the first and second floors. Each of the rooms 2 is connected to corridors (not illustrated), such as a hallway, through a corresponding door 2a, and the corridors on both floors communicate with a staircase hall 3. The air-conditioning apparatus 10 performs air-conditioning of the plurality of rooms 2 by performing a heating operation or a cooling operation.

The air-conditioning apparatus 10 is equipped with a vapor-compression refrigeration cycle to perform the cooling operation and the heating operation and includes a heat source unit 20 and an indoor unit 30. The indoor unit 30 cools or heats intake air by using an indoor heat exchanger 31 and blows the air to the plurality of rooms 2 through a duct 41. The duct 41 has openings communicating with the respective rooms 2, and dampers 42 are installed at the respective openings. Opening and closing and opening degrees of the dampers 42 are used to adjust temperatures in the respective rooms 2. The air that is sent to the respective rooms 2 passes sequentially through the doors 2a into the corridors and the staircase hall 3 to be collected by the indoor unit 30 and circulated.

In particular, in a case in which the building 1 is highly air-tight and highly heat-insulating and is difficult to ventilate, a ventilation device 4 is installed in the building 1. The ventilation device 4 includes an air-intake path for taking outside air into the building 1, an air-exhaust path for discharging, from the building 1, air contained in the building 1, and a heat exchanger 5 for exchanging heat between the air-intake path and the air-exhaust path. The ventilation device 4 takes outside air into the air-intake path through an eave-soffit louver and the attic of the building 1 and supplies the outside air to a duct 8 and the indoor unit 30 through a duct 9. The ventilation device 4 also takes inside air of the building 1 from the staircase hall 3 through a duct 6 and discharges the air outside through a duct 7.

In each of the plurality of rooms 2, a room controller 60 for making an indoor temperature reach a certain preset target temperature and an indoor temperature sensor 2x (see FIG. 2) for measuring the indoor temperature are installed. A preset target temperature of each of the rooms 2 is set manually or automatically in a corresponding room controller 60, and the room controller 60 controls the opening and closing and the opening degree of a corresponding damper 42 in such a manner that the indoor temperature that is detected by a corresponding indoor temperature sensor 2x reaches the preset target temperature. For example, when the indoor temperature is higher than the preset target temperature during the cooling operation or when the indoor temperature is lower than the preset target temperature during the heating operation, the room controller 60 performs control in such a manner that a corresponding damper 42 has a larger opening degree. Conversely, when the indoor temperature is lower than the preset target temperature during the cooling operation or when the indoor temperature is higher than the preset target temperature during the heating operation, the room controller 60 performs control in such a manner that a corresponding damper 42 has a smaller opening degree.

Next, the air-conditioning apparatus 10 will be described with reference to FIG. 1 and FIG. 2. As described above, the air-conditioning apparatus 10, which is equipped with the vapor-compression refrigeration cycle to perform the cooling operation and the heating operation, includes the heat source unit 20 and the indoor unit 30. The heat source unit 20 and the indoor unit 30 are connected to each other via a refrigerant pipe 10a in a ring configuration to realize a refrigeration cycle. Although FIG. 1 illustrates as an example a case in which the heat source unit 20 is installed inside the building 1, the heat source unit 20 may be an outdoor unit installed outside.

The heat source unit 20 includes a compressor 21, a flow switching device 22, an outdoor heat exchanger 23, an outdoor fan 24, and a throttle device 25. The compressor 21, which sucks and compresses refrigerant, is driven by using an inverter circuit. The flow switching device 22 switches the flow path between a heating flow path and a cooling flow path depending on switching of the operation mode between a cooling operation mode and a heating operation mode. The flow switching device 22 is formed of, for example, a four-way valve. During the cooling operation, the flow switching device 22 allows a discharge outlet of the compressor 21 and the outdoor heat exchanger 23 to be connected to each other and allows a suction inlet of the compressor 21 and the indoor heat exchanger 31 to be connected to each other. Conversely, during the heating operation, the flow switching device 22 allows the suction inlet of the compressor 21 and the outdoor heat exchanger 23 to be connected to each other and allows the indoor heat exchanger 31 and the discharge outlet of the compressor 21 to be connected to each other. Although an example of using a four-way valve as the flow switching device 22 is illustrated, the flow switching device 22 is not limited thereto, and may be, for example, a combination of a plurality of two-way valves.

The outdoor heat exchanger 23 exchanges heat between refrigerant and air (outside air) and has a structure including, for example, heat-transfer pipes through which the refrigerant flows and fins that increase a heat-transfer area between the refrigerant flowing through the heat-transfer pipes and the outside air. The outdoor heat exchanger 23 serves as a condenser that condenses and liquefies the refrigerant during the cooling operation and serves as an evaporator that evaporates and vaporizes the refrigerant during the heating operation. In addition, the outdoor fan 24 blows air to the outdoor heat exchanger 23. The throttle device 25 serves as a pressure reducing valve or an expansion valve that controls the pressure of the refrigerant flowing through the indoor heat exchanger 31 and is connected between the outdoor heat exchanger 23 and the indoor heat exchanger 31.

The indoor unit 30 includes the indoor heat exchanger 31 and an indoor fan 32. The indoor heat exchanger 31 exchanges heat between the refrigerant flowing from the heat source unit 20 and indoor air and has a structure including, for example, heat-transfer pipes through which the refrigerant flows and fins that increase a heat-transfer area between the refrigerant flowing through the heat-transfer pipes and the outside air. The indoor heat exchanger 31 serves as an evaporator during the cooling operation and serves as a condenser during the heating operation. The indoor heat exchanger 31 performs cooling and heating of spaces by exchanging heat between the indoor air and the refrigerant. The indoor fan 32 blows air to the indoor heat exchanger 31, and the air that is blown by the indoor fan 32 is subjected to heat exchange and then blown to each room 2 through the duct 41, whereby cooling and heating of each room 2 is performed.

Next, the flow of refrigerant in the air-conditioning apparatus 10 during the cooling operation and the heating operation will be separately described with reference to FIG. 1 and FIG. 2. First, an example operation of the air-conditioning apparatus 10 during the cooling operation will be described. In this operation, in the flow switching device 22, the discharge outlet of the compressor 21 and the outdoor heat exchanger 23 are connected to each other, and the indoor heat exchanger 31 and the suction inlet of the compressor 21 are connected to each other. First, refrigerant, which is a low-pressure gas, is compressed by the compressor 21 to be a high-pressure gas. The refrigerant in the high-pressure gas state is subjected to heat exchange with outside air in the outdoor heat exchanger (condenser) 23, and energy of the refrigerant is transferred to a heat source (e.g., air or water), whereby the refrigerant is condensed and becomes high-pressure liquid refrigerant.

Then, the pressure of the refrigerant is reduced by the throttle device 25 to a low-pressure two-phase state, and the refrigerant flows into the indoor heat exchanger 31. In the indoor heat exchanger (evaporator) 31, the refrigerant absorbs energy of outside air and evaporates to be a low-pressure gas. In this event, the air that is subjected to heat exchange with the refrigerant is cooled and supplied to the plurality of rooms 2 through the duct 41. Then, the refrigerant that outflows from the indoor heat exchanger 31 is sucked by the compressor 21.

Next, an example operation of the air-conditioning apparatus 10 during the heating operation will be described with reference to FIG. 1 and FIG. 2. In this operation, in the flow switching device 22, the discharge outlet of the compressor 21 and the indoor heat exchanger 31 are connected to each other, and the outdoor heat exchanger 23 and the suction inlet of the compressor 21 are connected to each other. First, refrigerant is compressed by the compressor 21 to be a high-pressure gas. Then, the refrigerant in the high-pressure gas state flows into the indoor heat exchanger 31 and is subjected to heat exchange with the indoor air. In this event, the refrigerant is condensed and becomes high-pressure liquid refrigerant, and water or the indoor air that is subjected to heat exchange is heated and supplied to the plurality of rooms 2 through the duct 41.

Then, the high-pressure liquid refrigerant flows into the throttle device 25 from the indoor heat exchanger (condenser) 31, and the pressure of the refrigerant is reduced by the throttle device 25 to a low-pressure two-phase state. The refrigerant in the low-pressure two-phase state is subjected to heat exchange with outside air in the outdoor heat exchanger (evaporator) 23 and evaporates to be a low-pressure gas. Then, the low-pressure gas refrigerant returns to the suction inlet of the compressor 21 through the flow switching device 22.

Figure 3:
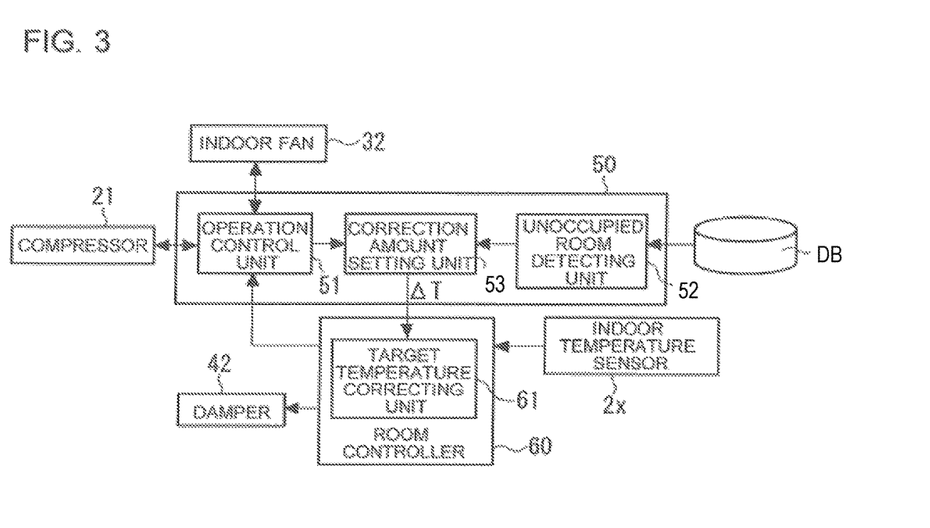
FIG. 3 is a block diagram illustrating an example of a controller in the air-conditioning apparatus illustrated in FIG. 2.

The air-conditioning apparatus 10 includes a controller 50 for controlling the above-described operations of the heat source unit 20 and the indoor unit 30. The controller 50 is connected to the room controllers 60 through communication lines so that data can be transmitted, and each of the room controllers 60 is configured to transmit, to the controller 50 in the heat source unit 20, an indoor temperature detected by a corresponding indoor temperature sensor 2x, a target indoor temperature, information on an opening degree of a corresponding damper 42, and other information.

The controller 50 includes an operation control unit 51 for controlling the operations of the heat source unit 20 and the indoor unit 30, and the operation control unit 51 automatically controls the operations in response to the room controllers 60 and the external environment. Note that the air-conditioning apparatus 10 includes an outside air temperature sensor 26 provided in the heat source unit 20, an intake air temperature sensor 33 disposed on an intake side of the indoor heat exchanger 31, and a discharge air temperature sensor 34 disposed on a discharge outlet of the indoor heat exchanger 31. Further, the operation control unit 51 controls the operations of the heat source unit 20 and the indoor unit 30 on the basis of temperature information detected by the temperature sensors 26, 33, and 34.

The operation control unit 51 sets a target discharge air temperature in accordance with air-conditioning capacities required for the respective rooms 2. Specifically, if the difference between a target indoor temperature and an actual indoor temperature in each of the rooms 2 is greater than a predetermined value, the operation control unit 51 determines that a large air-conditioning capacity is necessary and changes the target discharge air temperature. If the indoor temperature is higher than the target discharge air temperature during the cooling operation, the operation control unit 51 sets the target discharge air temperature to a temperature lower than the current target discharge air temperature. If the indoor temperature is lower than the target discharge air temperature during the heating operation, the operation control unit 51 sets the target discharge air temperature to a temperature higher than the current target discharge air temperature.

Conversely, if the difference between the target indoor temperature and the actual indoor temperature in each of the rooms 2 is less than or equal to the predetermined value, the operation control unit 51 determines that a large air-conditioning capacity is unnecessary and changes the target discharge air temperature. If the indoor temperature is lower than the target temperature during the cooling operation, the operation control unit 51 sets the target discharge air temperature to a temperature higher than the current target discharge air temperature. If the indoor temperature is higher than the target temperature during the heating operation, the operation control unit 51 sets the target discharge air temperature to a temperature lower than the current target discharge air temperature.

The operation control unit 51 controls the rotation speed of the compressor 21 on the basis of the above-described target discharge air temperature and a discharge air temperature measured by the discharge air temperature sensor 34. As the rotation speed of the compressor 21 is increased, the temperature of air discharged from the indoor heat exchanger 31 decreases during the cooling operation and increases during the heating operation. Accordingly, during the cooling operation, the operation control unit 51 performs control in such a manner that the rotation speed of the compressor 21 is increased when the discharge air temperature is higher than the target discharge air temperature and that the rotation speed of the compressor 21 is decreased when the discharge air temperature is lower than or equal to the target discharge air temperature. Similarly, during the heating operation, the operation control unit 51 performs control in such a manner that the rotation speed of the compressor 21 is increased when the discharge air temperature is lower than the target discharge air temperature and that the rotation speed of the compressor 21 is decreased when the discharge air temperature is higher than or equal to the target discharge air temperature. In the above manner, the operation control unit 51 performs control in such a manner that the rotation speed of the compressor 21 is increased in accordance with the air conditioning load for each room 2 and that the air-conditioning capacity exhibited by the refrigeration cycle is increased.

The operation control unit 51 also controls the rotation speed of the indoor fan 32 of the indoor unit 30 depending on statuses of the opening degrees of the dampers 42 transmitted from the room controllers 60 of the respective rooms 2. Specifically, the operation control unit 51 controls the rotation speed of the indoor fan 32 depending on, for example, the sum of the opening degrees of the dampers 42 of the respective rooms 2 or the maximum opening degree among the opening degrees of the dampers 42. The operation control unit 51 increases the rotation speed of the indoor fan 32 to increase airflow when the sum of the opening degrees of the dampers 42 or the maximum opening degree of the damper 42 is large and decreases the rotation speed of the indoor fan 32 to decrease airflow when the sum of the opening degrees of the dampers 42 or the maximum opening degree of the damper 42 is small.

An example in which the operation control unit 51 controls the rotation speed of the indoor fan 32 depending on the opening degrees of the dampers 42 has been described. However, the air-conditioning capacity changes depending on, other than the size of the opening degrees of the dampers 42 of the respective rooms 2, the total airflow of the indoor unit 30. Therefore, the operation control unit 51 may perform control by correcting the target discharge air temperature by taking such information into account. For example, when a damper 42 has a large opening degree, the target discharge air temperature may be corrected to be a low temperature during the cooling operation and to be a high temperature during the heating operation, and when a damper 42 has a small opening degree, the target discharge air temperature may be corrected to be a high temperature during the cooling operation and to be a low temperature during the heating operation.

In particular, the controller 50 has a function of correcting target indoor temperatures depending on whether a person is present or absent in the respective rooms 2. Specifically, the controller 50 includes an unoccupied room detecting unit 52, an occupied room database DB, and a correction amount setting unit 53. The unoccupied room detecting unit 52 detects an unoccupied room where no person is present of the plurality of rooms 2 by using the occupied room database DB. A user of the air-conditioning apparatus 10 stores in the occupied room database DB in advance information on a period of time during which a person stays in each room 2 as schedule information. The unoccupied room detecting unit 52 references the schedule information in the occupied room database DB and determines whether the person is present or absent in each room 2. From the occupied room database DB, the unoccupied room detecting unit 52 detects an unoccupied room where no person is present as a room 2 for which the target indoor temperature is to be corrected.

The correction amount setting unit 53 sets a temperature correction amount Tc for the target indoor temperature that is set to the unoccupied room detected by the unoccupied room detecting unit 52 and transmits the set temperature correction amount Tc to a corresponding room controller 60. Each room controller 60 includes a target temperature correcting unit 61 that corrects the target indoor temperature, and the target temperature correcting unit 61 corrects the already set target indoor temperature on the basis of the temperature correction amount Tc set by the correction amount setting unit 53. Note that the controller 50 may include the target temperature correcting unit 61 so that the controller 50 transmits the corrected target indoor temperature to a corresponding room controller 60.

The correction amount setting unit 53 sets the temperature correction amount Tc for the target indoor temperature of the unoccupied room in such a manner that the air-conditioning apparatus 10 reduces the air conditioning load for the unoccupied room. That is, the correction amount setting unit 53 sets the temperature correction amount Tc in such a manner as to increase the target indoor temperature during the cooling operation and decrease the target indoor temperature during the heating operation. In this case, as described above, the room controller 60 controls the damper 42 so that the corrected target indoor temperature can be realized. In addition, in response to the correction of the target indoor temperature, the operation control unit 51 adjusts the target discharge air temperature in the indoor unit 30 and controls the rotation speed of the compressor 21 to be decreased. The target indoor temperature is corrected in this manner, and accordingly, the operation capacity (rotation speed) of the compressor 21 is changed and controlled in such a manner as to reduce power consumption of the air-conditioning apparatus 10 as a whole.

In some cases in which the target indoor temperature of an unoccupied room is corrected in the above manner, the compressor may be required to operate at the minimum rotation speed or lower. That is, as the number of unoccupied rooms where no person is present increases among the rooms 2, the required air-conditioning capacity decreases, and the controller 50 performs control to decrease the rotation speed of the compressor 21. Since the compressor 21 has the minimum rotation speed, in a case in which the required capacity falls below the air-conditioning capacity that is obtained at the minimum rotation speed of the compressor 21, continuous operation of the compressor 21 at the minimum rotation speed will cause the air-conditioning capacity to become excessive, resulting in an excessively cooled state during cooling and an excessively heated state during heating. Accordingly, the compressor 21 will operate in such a manner as to repeat operating and stopping. However, such an operation state causes operation efficiency to be markedly decreased at the time of re-start after stopping, which, on the contrary, results in increase in power consumption of the air-conditioning apparatus. In this case, the correction amount setting unit 53 resets the temperature correction amount Tc on the basis of the rotation speed of the compressor 21.

After the target indoor temperature that is set to the room controller 60 is corrected on the basis of the temperature correction amount Tc, if the operation capacity of the compressor 21 becomes lower than or equal to a preset operation capacity, the correction amount setting unit 53 resets the temperature correction amount Tc to be decreased by an adjustment amount $\Delta T$. Specifically, in a case in which the correction amount setting unit 53 stores an initial temperature correction amount Tc0 (e.g., three degrees Celsius) and in which an unoccupied room is detected, first, the temperature correction amount Tc is set to the initial temperature correction amount Tc0 (Tc=Tc0), and a request to correct the target indoor temperature by using the temperature correction amount Tc is sent to the room controller 60. Then, the room controller 60 corrects the target indoor temperature to be a higher temperature by the temperature correction amount Tc=Tc0 (corrected target indoor temperature=target indoor temperature+Tc) during the cooling operation and corrects the target indoor temperature to be a lower temperature by the temperature correction amount Tc=Tc0 (corrected target indoor temperature=target indoor temperature−Tc) during the heating operation. After the target indoor temperature is corrected, the operation control unit 51 operates for a predetermined period of time while automatically adjusting the rotation speed of the compressor 21 in accordance with the corrected target indoor temperature.

Then, the correction amount setting unit 53 determines whether or not the rotation speed of the compressor 21 is lower than a preset threshold Nref. Note that the preset threshold Nref is set to a value that is higher than the minimum rotation speed of the compressor 21 by a predetermined amount, for example, to a value obtained by multiplying the minimum rotation speed according to the type of the compressor 21 and other information by 1.2. If the rotation speed of the compressor 21 is lower than the preset threshold Nref, the temperature correction amount Tc is reduced by the adjustment amount ΔT (Tc=Tc−ΔT). This adjustment amount ΔT is preset in the correction amount setting unit 53, an example of which is one degree Celsius. If the difference between the temperature correction amount Tc and the adjustment amount ΔT is smaller than zero, the correction amount setting unit 53 sets the temperature correction amount Tc to zero. This is to prevent the corrected target indoor temperature from becoming lower than (in the cooling operation) or higher than (in the heating operation) the target indoor temperature that is already set to the unoccupied room. Then, the temperature correction amount Tc that is adjusted to be decreased by the adjustment amount ΔT is transmitted to the room controller 60, and the room controller 60 resets the target indoor temperature.

On the other hand, if the rotation speed of the compressor 21 is higher than or equal to the preset threshold Nref, the temperature correction amount Tc is increased by the adjustment amount ΔT (Tc=Tc+ΔT). Upon this arithmetic operation, if the temperature correction amount Tc is larger than the initial temperature correction amount Tc0, the correction amount setting unit 53 sets the temperature correction amount Tc to Tc0. This is to prevent the target indoor temperature that is already set to the unoccupied room from markedly diverging from the corrected target indoor temperature. Then, the temperature correction amount Tc that is increased by the adjustment amount ΔT is transmitted to the room controller 60, and the room controller 60 resets the target indoor temperature. That is, the temperature correction amount Tc is any value between a minimum of zero degrees Celsius and a maximum of the initial temperature correction amount Tc0 (e.g., three degrees Celsius), and the target indoor temperature is corrected by using an amount from 0 to the initial temperature correction amount Tc0 (three degrees Celsius).

In this manner, when the target temperature of the unoccupied room is set to a higher temperature during the cooling operation and the rotation speed of the compressor 21 is decreased, in accordance with the rotation speed of the compressor 21, the temperature correction amount Tc for the target indoor temperature is reset in such a manner as to increase the operation load for the unoccupied room. Therefore, without making occupants uncomfortable, it becomes possible to prevent increase in power consumption caused by excessively decreasing the rotation speed of the compressor 21.

That is, conventionally, when the compressor operates at the minimum rotation speed for a certain period of time and the discharge air temperature of the indoor heat exchanger 31 is a temperature at which a state is determined as being an excessive capacity, in which, for example, the discharge air temperature is maintained lower than the target discharge air temperature by two degrees Celsius or more for ten minutes or more during the cooling operation, or the discharge air temperature is maintained higher than the target discharge air temperature by two degrees Celsius or more for ten minutes or more during the heating operation, the compressor 21 stops for a while to avoid the excessive capacity state. After a certain period of time, when an air-conditioning operation is determined to be necessary, for example, when the indoor temperature of at least one room 2 becomes higher than the target temperature by one degree Celsius or more during the cooling operation or when the indoor temperature of at least one room 2 becomes lower than the target temperature by one degree Celsius or more during the heating operation, operation of the compressor 21 is restarted. By repeating the rotation and stopping of the compressor 21 as described above, an hourly average air-conditioning capacity can be decreased, avoiding an excessive air-conditioning capacity state. However, in such operation in which operation of the compressor 21 is resumed and the compressor 21 is restarted, the efficiency of the refrigeration cycle is generally low until the refrigeration cycle state becomes stable, resulting in operation with increased power consumption.

Meanwhile, in the air-conditioning apparatus 10 illustrated in FIG. 2, when the rotation speed of the compressor 21 approaches the minimum rotation speed, the temperature correction amount Tc for the target temperature is changed in such a manner that the load is increased to allow the compressor 21 to operate continuously without stopping. This avoids start-stop operation of the compressor 21, which can decrease power consumption.

In addition, in a case in which there are a plurality of unoccupied rooms where no person is present, the correction amount setting unit 53 may adjust temperature correction amount Tc and reset target indoor temperatures of all the unoccupied rooms at the same time or may adjust temperature correction amount Tc by using adjustment amount ΔT and reset target indoor temperatures in an order of rooms where a person will be present earlier among the plurality of unoccupied rooms on the basis of occupied room schedule stored in the occupied room database DB.

For example, a case will be described in which there are three unoccupied rooms 2A to 2C. In this case, a person will be present in the unoccupied room 2A, the unoccupied room 2B, and the unoccupied room 2C, from 4 pm, 6 pm, and 9 pm, respectively, and priorities are set in the order of the unoccupied room 2A, the unoccupied room 2B, and the unoccupied room 2C. After operation is performed in the unoccupied rooms 2A to 2C by using target indoor temperatures corrected by using an initial temperature correction amount Tc0 (e.g., three degrees Celsius), when the rotation speed of the compressor 21 becomes lower than the preset threshold Nref, the correction amount setting unit 53 first adjusts, by using an adjustment amount ΔT, a temperature correction amount Tc for the unoccupied room 2A where a person will be present from 4 pm. Once the temperature correction amount Tc for the unoccupied room 2A reaches the minimum, which is zero degrees Celsius, and the rotation speed of the compressor 21 is still lower than the preset threshold Nref, the correction amount setting unit 53 then adjusts a temperature correction amount Tc for the unoccupied room 2B having the second highest priority where a person will be present from 6 pm. Once the temperature correction amount Tc for the unoccupied room 2B where a person will be present from 6 pm reaches the minimum, which is zero degrees Celsius, and the rotation speed of the compressor 21 is still lower than the preset threshold Nref, the correction amount setting unit 53 adjusts a temperature correction amount Tc for the unoccupied room 2C where a person will be present from 9 pm.

By preferentially adjusting the temperature correction amount Tc from the room where a person will be present earliest in the above manner, it becomes possible to shorten the period of time for correcting the target indoor temperatures for continuous operation of the compressor 21. Therefore, the time for operation with the reset target indoor temperatures can be shortened, and the operating efficiency of the air-conditioning apparatus 10 can be increased. In a case in which a corrected target indoor temperature that is set when a person is not present is cancelled and changed to an original, uncorrected target temperature that is set when a person is present, the load on the air-conditioning apparatus 10 is increased. Accordingly, operation is realized in such a manner that the capacity is distributed to appropriate places, which can decrease integrated power consumption of the air-conditioning apparatus 10.

Figure 4:
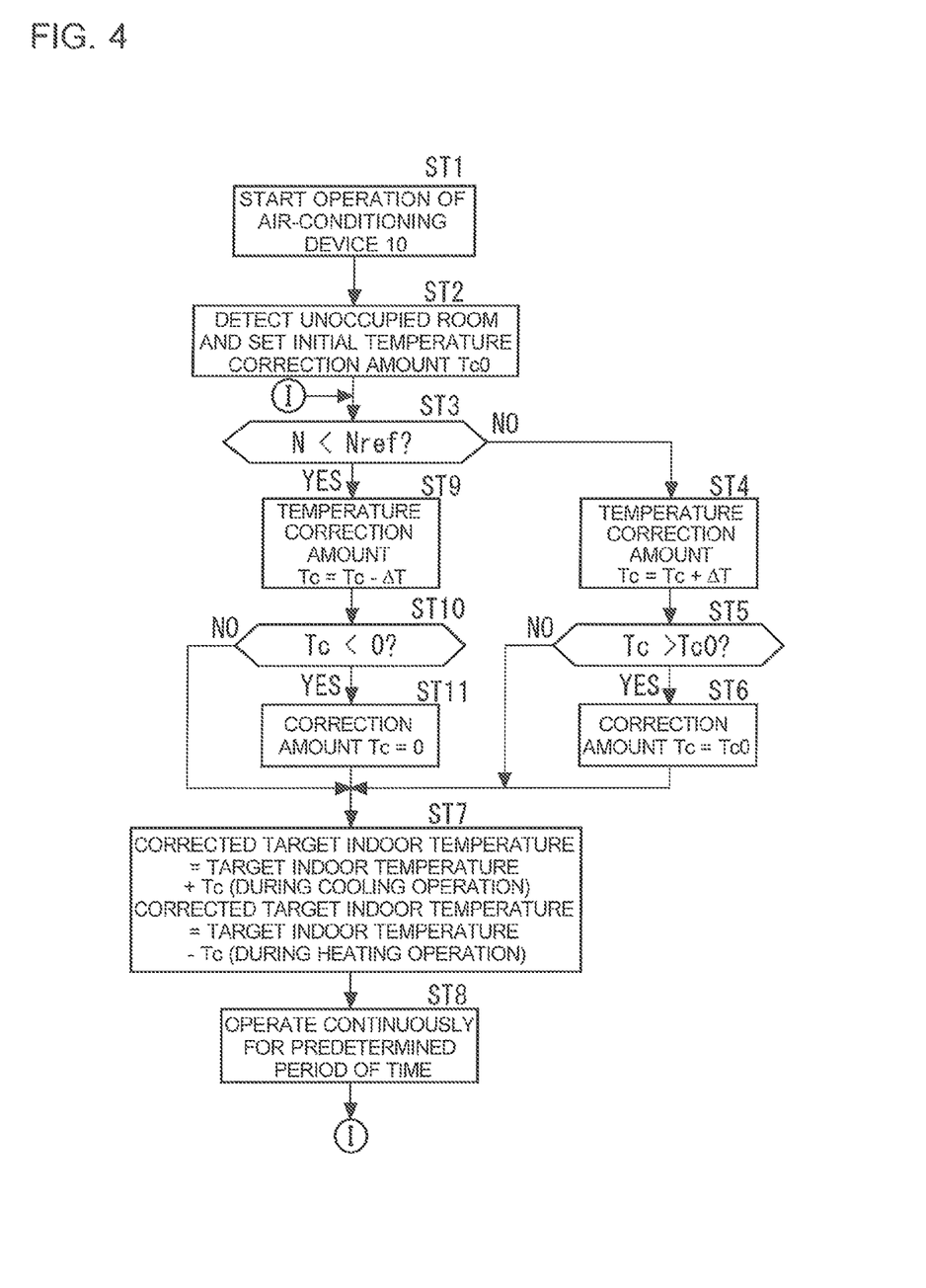
FIG. 4 is a flowchart illustrating example operation of the air-conditioning apparatus illustrated in FIG. 1.

FIG. 4 is a flowchart illustrating example operation of the air-conditioning apparatus illustrated in FIG. 1, and the example operation of the air-conditioning apparatus will be described with reference to FIG. 1 to FIG. 4. First, operation of the air-conditioning apparatus 10 is started, and the operation control unit 51 and the room controllers 60 automatically control indoor temperatures based on the respective temperature sensors (step ST1). Then, if the unoccupied room detecting unit 52 detects an unoccupied room, a target indoor temperature of the unoccupied room is corrected. In this case, the correction amount setting unit 53 sets an initial temperature correction amount Tc0 (e.g., three degrees Celsius) as a temperature correction amount Tc (step ST2).

The air-conditioning apparatus 10 operates continuously to keep this state for a predetermined period of time, and then the correction amount setting unit 53 determines whether or not the rotation speed of the compressor 21 is lower than the preset threshold Nref (step ST3). If the rotation speed of the compressor 21 is lower than the preset threshold Nref, an adjustment amount $\Delta T$ is added to the temperature correction amount Tc on the assumption that the repeated rotate-stop operation of the compressor 21 may not happen (step ST4). Then, it is determined whether or not the temperature correction amount Tc obtained after addition is larger than the initial temperature correction amount Tc0 (step ST5). If the temperature correction amount Tc obtained after addition is larger than the initial temperature correction amount Tc0, the temperature correction amount Tc is set to the initial temperature correction amount Tc0 (step ST6). In other words, the temperature correction amount Tc is set to a value that does not exceed the initial temperature correction amount Tc0.

Then, the temperature correction amount Tc set by the correction amount setting unit 53 and a request to correct the target indoor temperature are transmitted from the controller 50 to a corresponding room controller 60. Then, the corrected target indoor temperature is set to the room controller 60 to a temperature that is higher than the previous target indoor temperature by the temperature correction amount Tc (step ST7). Note that the temperature correction amount Tc is added to the target indoor temperature during the cooling operation, and the temperature correction amount Tc is subtracted from the target indoor temperature during the heating operation. Then, the air conditioning load for the unoccupied room 2 is reduced, and accordingly, the opening degree of a corresponding damper 42 is controlled to be small, and also the rotation speed of the compressor 21 is controlled to be low.

The air-conditioning apparatus 10 operates continuously for a predetermined period of time (step ST8), and then it is determined again whether or not the rotation speed of the compressor 21 is lower than the preset threshold Nref (step ST4). For example, in a case in which the air conditioning load is reduced with increase in the number of unoccupied rooms and in which the rotation speed of the compressor 21 is lower than the preset threshold Nref, the start-stop operation of the compressor 21 may happen. Therefore, the temperature correction amount Tc is corrected to be decreased by the adjustment amount $\Delta T$ (step ST9). To prevent the corrected target indoor temperature from becoming a temperature lower than the already set target indoor temperature, it is determined whether or not the temperature correction amount Tc is smaller than zero degrees Celsius (step ST10). If the temperature correction amount Tc is smaller than zero degrees Celsius, the target indoor temperature is not corrected (step ST11). The adjustment of the temperature correction amount Tc by using the adjustment amount $\Delta T$ and the resetting of the target indoor temperature may be performed in the order of rooms where a person will be present earlier among the plurality of unoccupied rooms on the basis of an occupied room schedule stored in the occupied room database DB.

Then, the temperature correction amount Tc that is reset by the correction amount setting unit 53 and a request to reset the target indoor temperature are transmitted from the controller 50 to a corresponding room controller 60. Then, for example, in a case in which the temperature correction amount Tc is three degrees Celsius, a target indoor temperature is adjusted by using a temperature correction amount Tc of two degrees Celsius, which is smaller by the adjustment amount $\Delta T$ (e.g., one degree Celsius), is set to the room controller 60 (step ST8). Thus, the air conditioning load for the unoccupied room 2 is increased, and accordingly, the opening degree of a corresponding damper 42 is controlled to be larger, and also the rotation speed of the compressor 21 is controlled to be higher. In other words, the target indoor temperature is corrected in such a manner that the air-conditioning capacity is increased before the compressor 21 performs the start-stop operation in which operation and stopping are repeated.

In the above manner, by correcting target indoor temperatures of the respective rooms 2 where a person is not present in such a manner as to decrease the required air-conditioning capacity, the operation capacity of the compressor 21 can be decreased, and power consumption of the air-conditioning apparatus 10 can be decreased. In addition, in a case in which the rotation speed of the compressor 21 is decreased and the operation and stopping of the compressor 21 may repeat, the required air-conditioning capacity is increased so that the compressor 21 can perform continuous operation. Therefore, it is possible to prevent decrease in efficiency of the air-conditioning apparatus 10 due to the repeated operation and stopping, thereby realizing improved power-saving operation.

In particular, by preferentially performing adjustment for an unoccupied room where a person will be present the earliest so that the air-conditioning capacity can be increased, it is possible during the person's absence to shorten the period of time when the amount of heat transfer from the unoccupied room is high and heat loss increases, thereby realizing power-saving operation with reduced heat loss.

In addition, target temperatures vary because temperature correction amount Tc is gradually increased and decreased by adjustment amount $\Delta T$. Accordingly, the correction amount setting unit 53 can change the operation status of the compressor 21 in accordance with the increase and decrease in the number of unoccupied rooms. Therefore, even when the situation of the rooms 2 changes, continuous operation of the compressor 21 can be realized.

Embodiments of the present invention are not limited to the above Embodiment. For example, although the case has been described as the example in which the occupied room detecting unit detects occupied rooms and unoccupied rooms on the basis of registered information in the occupied room database DB, any method may be employed to detect an unoccupied room. For example, lifestyle patterns of users may be collected from information on the use of devices such as lighting equipment provided in the respective rooms 2, human detection information obtained by infrared motion sensors and other sensors, information on opening and closing of inside doors, and other information, and, on the basis of at least one of the above pieces of information, an unoccupied room may be detected. In addition, the unoccupied room detecting unit 52 may detect occupied room information not only from information regarding the rooms 2 as targets but also from lifestyle patterns in the entire home. For example, a home energy management system (HEMS) that monitors states of all devices in the building 1 may be additionally introduced, and the system may process occupied room information. Further, the controller 50 may be provided in a HEMS controller, and the HEMS may inform the air-conditioning apparatus 10 of a correction value for a target indoor temperature.

Furthermore, although the case has been described above as the example in which the correction amount setting unit 53 increases and decreases the temperature correction amount Tc by using the adjustment amount ΔT, an adjustment amount ΔT for increasing the temperature correction amount Tc and an adjustment amount ΔT for decreasing the temperature correction amount Tc may be set to different values.

REFERENCE SIGNS LIST 1 building 2 room 2A, 2B, 2C unoccupied room 2a door 2x indoor temperature sensor 3 staircase hall 4 ventilation device 5 heat exchanger 6-9, 41 duct 10 air-conditioning apparatus 10a refrigerant pipe 20 heat source unit 21 compressor 22 flow switching device 23 outdoor heat exchanger 24 outdoor fan 25 device 26 outside air temperature sensor 30 indoor unit 31 indoor heat exchanger 32 indoor fan 33 intake air temperature sensor 34 discharge air temperature sensor 42 damper 50 controller 51 operation control unit 52 unoccupied room detecting unit 53 correction amount setting unit 60 room controller 61 target temperature correcting unit DB occupied room database Nref preset threshold Tc temperature correction amount Tc0 initial temperature correction amount ΔT adjustment amount.

The invention claimed is:
1. An air-conditioning apparatus configured to perform heating or cooling of a plurality of rooms and to operate based on target indoor temperatures set to room controllers each provided for a corresponding one of the plurality of rooms, the air-conditioning apparatus comprising:
a heat source unit including a compressor;
an indoor unit connected to the heat source unit via a refrigerant pipe and configured to perform cooling or heating of the plurality of rooms through a duct; and
a controller configured to acquire the target indoor temperatures from the room controllers of the plurality of rooms to control operations of the heat source unit and the indoor unit based on the acquired target indoor temperatures, wherein the controller is configured to
control, by an operation control unit, an operation of the compressor of the heat source unit based on the target indoor temperatures of the plurality of rooms,
store, in an occupied room database, scheduled time for presence and absence of a person in respective rooms of the plurality of rooms,
detect, by an unoccupied room detecting unit, from the occupied room database, an unoccupied room where no person is present of the plurality of rooms, and
set, by a correction amount setting unit, a temperature correction amount for correcting a target indoor temperature of the target indoor temperatures set to a corresponding one of the room controllers of the unoccupied room detected by the unoccupied room detecting unit in such a manner that an air conditioning load for the unoccupied room is reduced,
after the target indoor temperature set to the room controller is corrected based on the temperature correction amount, and when an operation capacity of the compressor becomes smaller than or equal to a preset operation capacity, reset, by the correction amount setting unit, the temperature correction amount to be decreased by a preset adjustment amount, and
when the unoccupied room detecting unit detects a plurality of unoccupied rooms, reset, by the correction amount setting unit, temperature correction amounts for target indoor temperatures for all the unoccupied rooms, and
wherein the correction amount setting unit further determines an order of rooms where the scheduled time for presence stored in the occupied room database is earlier among the plurality of unoccupied rooms, and resets the temperature correction amounts for the plurality of unoccupied rooms in the order which is determined, to perform resetting for the plurality of unoccupied rooms in the order based on when a person is next scheduled to be present.

2. The air-conditioning apparatus of claim 1, wherein the controller is further configured to
detect, by the unoccupied room detecting unit, the unoccupied room from the occupied room database.

3. The air-conditioning apparatus of claim 1, wherein the controller is further configured to
after the target indoor temperature is corrected in the room controller by using the temperature correction amount, reset, by the correction amount setting unit, the temperature correction amount to be increased by the adjustment amount when the operation capacity of the compressor controlled by the operation control unit is larger than the preset operation capacity.

4. The air-conditioning apparatus of claim 3, wherein the controller is further configured to
set, by the correction amount setting unit, a preset initial temperature correction amount as the temperature correction amount that is set at first and reset stepwise the temperature correction amount from the initial temperature correction amount by using the adjustment amount, and a maximum of the temperature correction amount is equal to the initial temperature correction amount and a minimum temperature correction amount is equal to zero degrees Celsius.

5. The air-conditioning apparatus of claim 1, wherein the controller is further configured to
set, by the correction amount setting unit, the temperature correction amount for increasing the target indoor temperature during a cooling operation and set the temperature correction amount for decreasing the target indoor temperature during a heating operation.

6. The air-conditioning apparatus of claim 1, wherein the controller is further configured to
    detect, by the unoccupied room detecting unit, the unoccupied room based on occupied room information managed by a home energy management system.

\* \* \* \* \*